United States Patent
Nakamura et al.

(10) Patent No.: US 11,390,318 B2
(45) Date of Patent: Jul. 19, 2022

(54) MOTOR CONTROLLER AND MOTOR CONTROL SYSTEM HAVING SAME

(71) Applicant: DENSO CORPORATION, Kariya (JP)

(72) Inventors: Koichi Nakamura, Kariya (JP); Nobuyori Nakajima, Kariya (JP); Go Endoh, Kariya (JP); Yosuke Ogi, Kariya (JP); Atsuko Oka, Kariya (JP); Shuji Kuramitsu, Kariya (JP); Takashi Suzuki, Kariya (JP); Haruo Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 96 days.

(21) Appl. No.: 16/711,794

(22) Filed: Dec. 12, 2019

(65) Prior Publication Data
US 2020/0207408 A1 Jul. 2, 2020

(30) Foreign Application Priority Data

Dec. 26, 2018 (JP) .............................. JP2018-243543

(51) Int. Cl.
*B62D 5/04* (2006.01)
*B62D 15/02* (2006.01)

(52) U.S. Cl.
CPC ......... *B62D 5/0484* (2013.01); *B62D 5/0463* (2013.01); *B62D 5/0487* (2013.01); *B62D 15/021* (2013.01)

(58) Field of Classification Search
CPC .......................... B62D 15/021; B62D 15/0235
See application file for complete search history.

(56) References Cited

U.S. PATENT DOCUMENTS 6,755,276 B2 * 6/2004 Clephas ................. B62D 5/003
180/402
2013/0289826 A1 * 10/2013 Yoshitake ............ B62D 15/021
701/42
(Continued)

FOREIGN PATENT DOCUMENTS

JP 2013-141863 A 7/2013
JP 2015-003689 A 1/2015
(Continued)

*Primary Examiner* — Jeff A Burke
*Assistant Examiner* — Jerrod Irvin Davis
(74) *Attorney, Agent, or Firm* — Maschoff Brennan

(57) ABSTRACT

A motor controller for controlling a motor includes first and second angle sensors detecting motor rotation, and first and second detection circuits detecting rotation number information based on sensor output from the angle sensors. Further, the motor controller includes a steer angle information obtainer obtaining steer angle information involving steering of a vehicle from an external sensor, which is different from the angle sensors, and an abnormality determiner determining abnormality of information that has a matching degree of lower than a preset value when post-conversion information, or value measured by the same characteristics. This information is compared with each other after conversion from the rotation number information and from the steer angle information, and is used by a control amount calculator to calculate a control amount of the motor based on the information determined as having no abnormality by the abnormality determiner.

9 Claims, 7 Drawing Sheets

(56) References Cited

U.S. PATENT DOCUMENTS

| | | | |
|---|---|---|---|
| 2014/0343791 A1* | 11/2014 | Suzuki | B62D 5/0487 |
| | | | 701/41 |
| 2015/0367887 A1* | 12/2015 | Fujita | B62D 15/021 |
| | | | 701/41 |
| 2016/0229445 A1* | 8/2016 | Sasaki | B62D 5/046 |
| 2017/0015348 A1* | 1/2017 | Sasaki | B62D 6/00 |
| 2017/0291640 A1 | 10/2017 | Fujita et al. | |
| 2017/0305455 A1 | 10/2017 | Hisanaga et al. | |
| 2018/0229761 A1 | 8/2018 | Fujita et al. | |
| 2018/0234039 A1* | 8/2018 | Kuwahara | H02P 6/16 |
| 2019/0140574 A1 | 5/2019 | Yamasaki | |
| 2021/0129855 A1* | 5/2021 | Nakao | B62D 5/04 |

FOREIGN PATENT DOCUMENTS

| | | | |
|---|---|---|---|
| JP | 2016-007981 A | 1/2016 |
| JP | 5967338 B2 | 8/2016 |
| JP | 2017-052448 A | 3/2017 |
| JP | 2017-189034 A | 10/2017 |
| JP | 2017-191092 A | 10/2017 |
| JP | 2018-128429 A | 8/2018 |
| JP | 2018-177097 A | 11/2018 |

\* cited by examiner

MOTOR CONTROLLER AND MOTOR CONTROL SYSTEM HAVING SAME

CROSS REFERENCE TO RELATED APPLICATION

The present application is based on and claims the benefit of priority of Japanese Patent Application No. 2018-243543, filed on Dec. 26, 2018, the disclosure of which is incorporated herein by reference.

TECHNICAL FIELD

The present disclosure generally relates to a motor controller that controls a motor involved in steering of a vehicle, and a motor control system including the same.

BACKGROUND INFORMATION

In order to perform power steering using a motor, calculation accuracy of a steer angle (i.e., steering angle of a steering wheel or turning angle of a wheel) is required to match the steering angle with the turning angle. In the related art, there is known a technique related to abnormality diagnosis of an angle sensor that detects the rotation of a motor in order to ensure the accuracy of the steer angle calculation. In this technique, two diagnoses are performed, i.e., (i) a comparison diagnosis is performed to compare angle sensor signals obtained from two independent angle sensors, and (ii) an individual diagnosis of each angle sensor signal. When it is determined that only one of the angle sensor signals is abnormal in the individual diagnosis, the normal angle sensor signal is used and is treated as downgraded, and when both of the two sensor signals are determined as abnormal, the angle sensor signals are not used.

In the Related Art, when one of the two angle sensor signals is determined as abnormal by the individual diagnosis, the other angle sensor signal is treated as downgraded. Therefore, in such operation scheme, the functions involving motor control may either be continuously used while operable, or be stopped when possibly causing a critical incident, which leads to a loss of motor control continuity.

SUMMARY

It is an object of the present disclosure to provide a technique for improving the continuity of motor control in a motor controller that controls a motor involved in steering of a vehicle.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
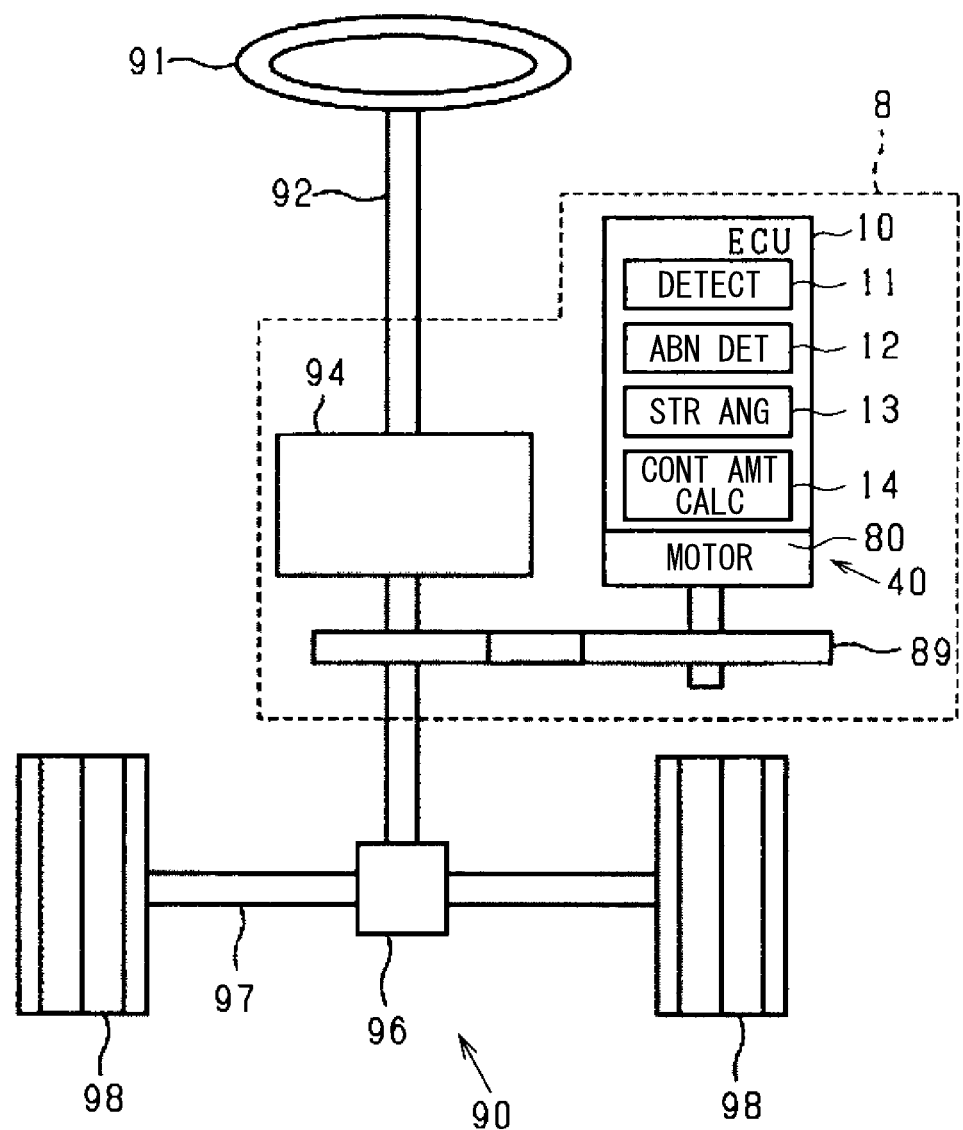
FIG. 1 is a schematic configuration diagram of a steering system provided with a motor controller according to a first embodiment of the present disclosure.

In the following embodiments, similar configurations are designated with the same reference numerals thereby to simplify the description without redundancy.

First Embodiment

As shown in FIG. 1, a steering system 90 of a vehicle includes a steering wheel 91 which is a steering member, a steering shaft 92, a pinion gear 96, a rack shaft 97, wheels 98 (i.e., with tires), a steering device 8 and the like. The steering device 8 is an electric power steering device for assisting the steering operation of the vehicle.

The steering wheel 91 is connected to the steering shaft 92. The steering shaft 92 is provided with a torque sensor 94 for detecting a steering torque Ts. The pinion gear 96 is provided at an axial end of the steering shaft 92. The pinion gear 96 engages with the rack shaft 97. A pair of wheels 98 is coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of wheels 98 is steered to an angle corresponding to the displacement amount of the rack shaft 97.

The steering device 8 includes a drive device 40 having a motor 80 and an ECU 10 (i.e., electronic control unit), and a speed reduction gear 89 as a power transmission unit that decelerates the rotation of the motor 80 and transmits it to the steering shaft 92. The motor 80 is a so-called steering control assist motor, and the drive device 40 is a so-called mechanism-controller integrated type drive device in which the ECU 10 and the motor 80 are integrated to form one body.

Figure 2:
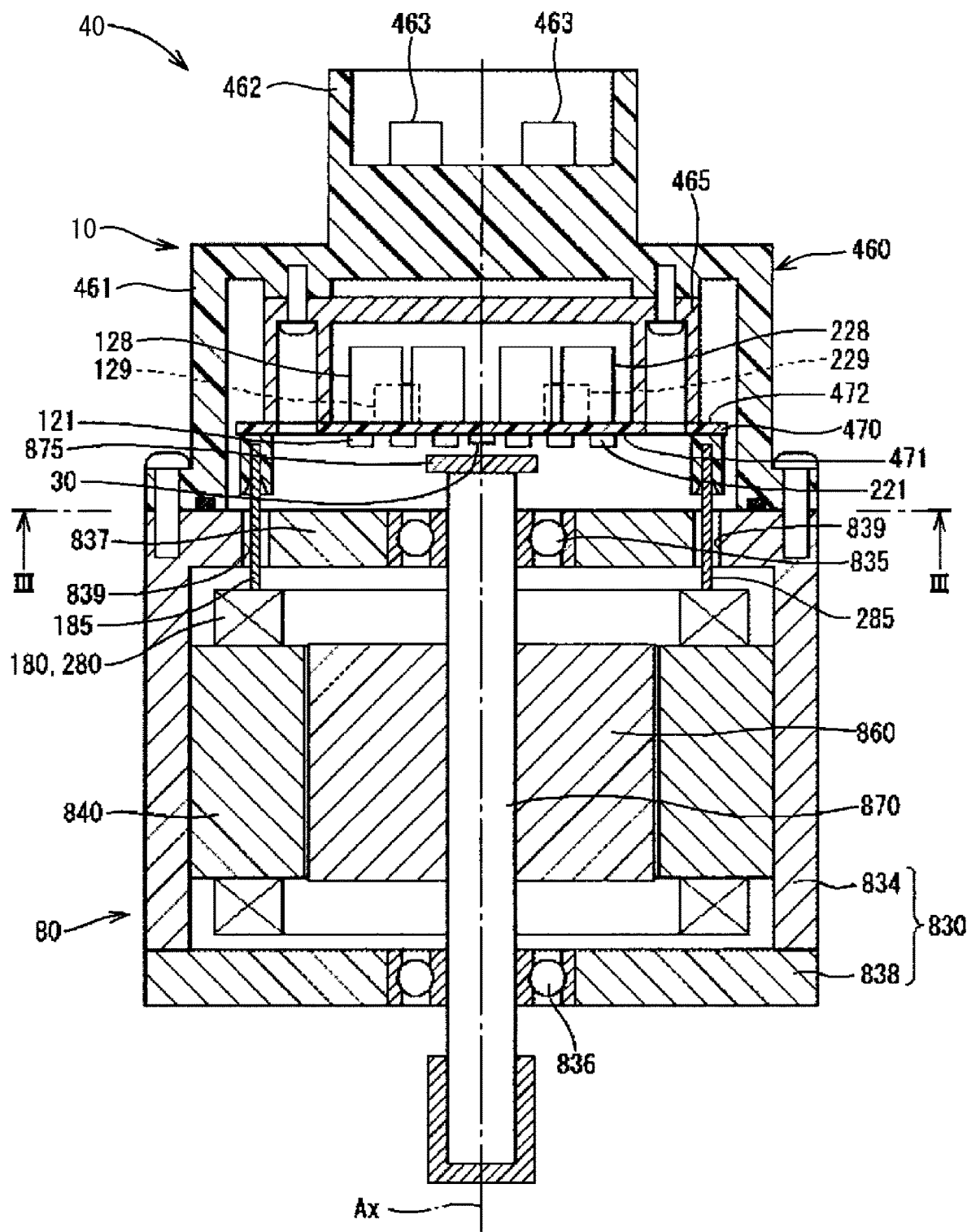
FIG. 2 is a cross-sectional view of a drive device provided with the motor controller according to the first embodiment of the present disclosure.

The motor 80 outputs an assist torque for assisting the steering of the steering wheel 91 by the driver, and is driven by an electric power supplied from power sources 191 and 291 (see FIG. 4), and rotates the speed reduction gear 89 forward and backward. The motor 80 is a three-phase brushless motor, and has a rotor 860 and a stator 840 (see FIG. 2).

The motor 80 has a first motor winding 180 and a second motor winding 280 respectively as a winding set. The motor windings 180 and 280 have the same electrical characteristics, and are wound around the stator 840 with their electrical angles shifted from each other by 30 degrees. Correspondingly, phase currents are controlled to be supplied to the motor windings 180 and 280 such that the phase currents have a phase difference $\varphi$ of 30 degrees. By optimizing a current supply phase difference, the output torque is improved. Further, it is possible to reduce a sixth-order torque ripple. Furthermore, it is possible to maximize advantages of cancellation of noise and vibration since the electric current is smoothed by the current supply with phase difference. Further, since heat generation is also averaged among the winding sets, temperature-dependent intersystem errors among sensor detection values and torques can be reduced, and a suppliable amount of electric current is averaged.

In the drive device 40, the ECU 10 is integrally provided on one axial end of the motor 80 as a mechanism-controller integrated one-body device. Alternatively, the motor 80 and the ECU 10 may be provided separately in two bodies. The ECU 10 is positioned coaxially with an axis Ax of a shaft 870 on one end opposite to an output shaft of the motor 80. The ECU 10 may alternatively be provided on the output shaft side end of the motor 80. By adopting the mechanism-controller integrated type configuration, an efficient installation of the ECU 10 and the motor 80 in a restricted installation space of the vehicle is enabled.

The drive device 40 includes the motor 80 as a rotating electric machine, two detection circuits 130 and 230 for detecting the rotation of the motor 80, and two power sources 191 and 291 for supplying electric power to the two detection circuits 130 and 230.

Hereinafter, a combination of a first inverter 120, the first detection circuit 130, a first control unit 170 and the like related to a drive control of the first motor winding 180 is referred to as a first system L1, and a combination of a second inverter 220, the second detection circuit 230, a second control unit 270, and the like related to a drive control of the second motor winding 280 is referred to as a second system L2. In each of the drawings, an upper side divided by a broken line is shown as the first system L1 and a lower side below the broken line is shown as the second system L2, except for a case where it is particularly mentioned.

Further, a configuration related to the first system L1 is basically indicated with reference numerals of 100s, and a configuration related to the second system L2 is basically indicated with reference numerals of 200s. In the first system L1 and the second system L2, same or similar configuration is designated with same reference numeral in the least significant two digits. For the other configuration described below, the term "first" is indicated with a suffix "1," and the term "second" is indicated with a suffix "2."

The motor 80 includes, in addition to a stator 840 and a rotor 860, a housing 830 that houses the stator 840 and the rotor 860, and the like. The stator 840 is fixed to the housing 830 and the motor windings 180 and 280 are wound thereon. The rotor 860 is placed radially inside the stator 840 to be rotatable relative to the stator 840.

The shaft 870 is fitted in the rotor 860 to rotate integrally with the rotor 860. The shaft 870 is rotatably supported by the housing 830 by bearings 835 and 836. The end portion of the shaft 870 on the ECU 10 side protrudes from the housing 830 toward the ECU 10. At an end of the shaft 870 on the ECU 10 side, a magnet 875 as a detection target is provided.

The housing 830 has a bottomed cylindrical case 834 including a rear end frame 837, and has a front end frame 838 placed on an open side of the case 834. The case 834 and the front end frame 838 are fastened to each other by bolts or the like. Lead wire insertion holes 839 are formed on the rear end frame 837. Lead wires 185 and 285 connected to each phase of the motor windings 180 and 280 are inserted through the lead wire insertion holes 839. The lead wires 185 and 285 are taken out from the lead wire insertion holes 839 to the ECU 10 side and connected to a circuit board 470.

The ECU 10 includes a cover 460 and a heat sink 465 fixed to the cover 460 in addition to the circuit board 470 fixed to the heat sink 465. The ECU 10 further includes various electronic components and the like mounted on the circuit board 470.

The cover 460 protects the electronic components from external impacts and prevents dust, water or the like from entering into the ECU 10. The cover 460 consists of a cover main body 461 and a connector member 462 as an integrally-formed one body. The connector member 462 may be separated from the cover main body 461. Terminals 463 of the connector member 462 are connected to the circuit board 470 via a wiring (not shown) or the like. The number of connectors and the number of terminals may be changed in correspondence to the number of signals and the like. The connector member 462 is provided at the end portion in the axial direction of the drive device 40 and is open on one side opposite to the motor 80.

The circuit board 470 is, for example, a printed circuit board, and is positioned to face the rear end frame 837. On the circuit board 470, the electronic components of the first and second systems are mounted independently for each system so that the two systems are provided in a fully redundant configuration. According to the present embodiment, the electronic components are mounted on one circuit board 470. The electronic components may alternatively be mounted on a plurality of circuit boards.

Figure 3:
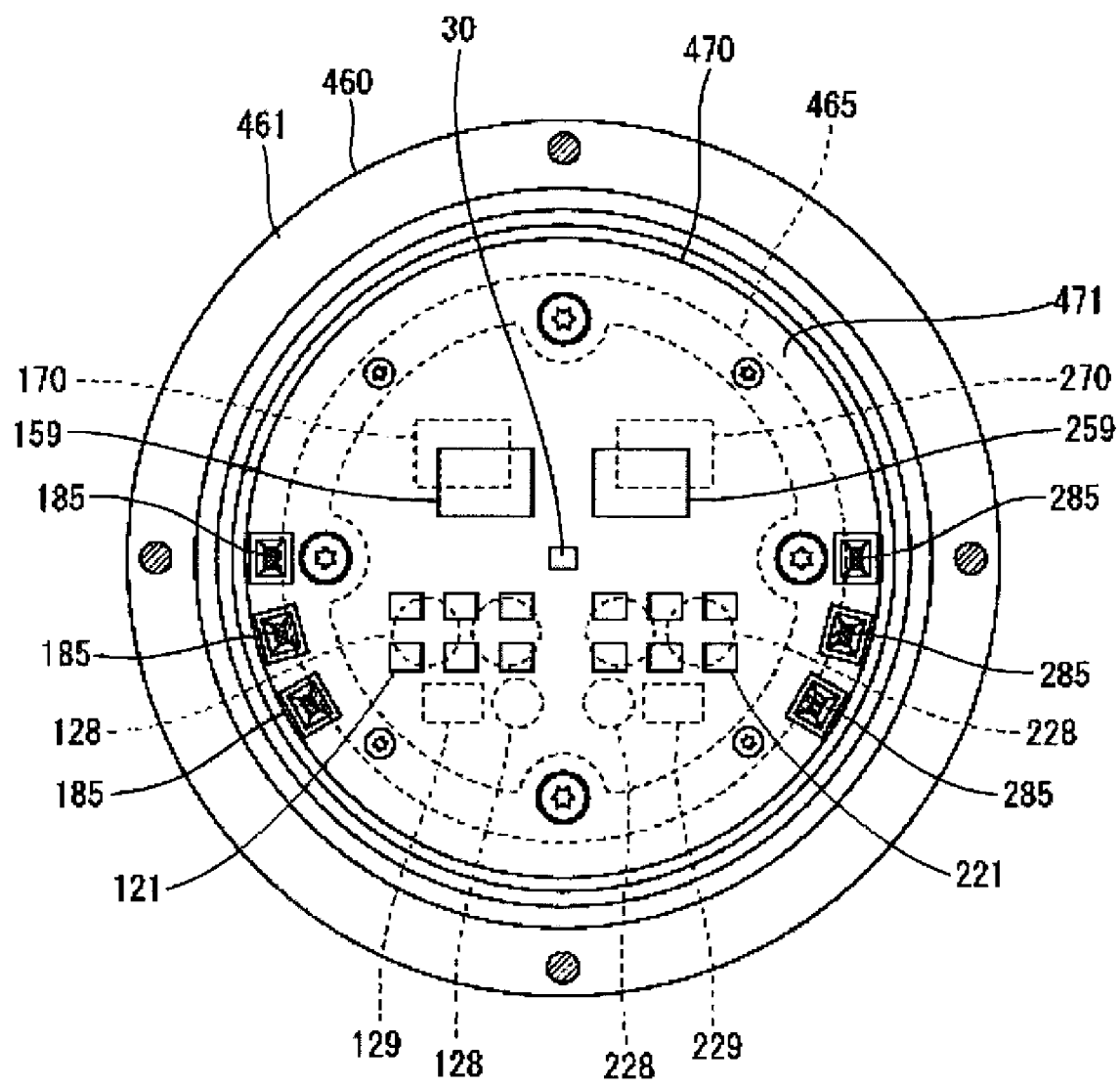
FIG. 3 is a cross-sectional view taken along a line III-III in FIG. 2.

Of the two principal surfaces of the circuit board 470, one surface facing the motor 80 is referred to as a motor-side surface 471 and the other surface opposite from the motor 80 is referred to as a cover-side surface 472. As shown in FIG. 3, on the motor-side surface 471, a switching element 121 constituting the first inverter 120, a switching element 221 constituting the second inverter 220, a rotation angle sensor 30, custom ICs 159, 259, and the like as a detection circuit are implemented. The rotation angle sensor 30 is mounted at a position facing the magnet 875 so as to be able to detect a change in a magnetic field as the magnet 875 rotates.

On the cover-side surface 472, capacitors 128, 228, inductors 129, 229, and microcomputers constituting the control units 170, 270 are mounted. In FIG. 3, the microcomputers constituting the first control unit 170 and the second control unit 270 are numbered "170" and "270", respectively. The capacitors 128 and 228 smooth the power input from the power sources 191 and 291. The capacitors 128 and 228 assist supply of electric power to the motor 80 by storing electric charge therein. The capacitors 128 and 228 and the inductors 129 and 229 constitute a filter circuit to reduce noise transmitted to other devices sharing the power sources 191 and 291 with the drive device 40. Note that, power source relays, motor relays, current sensors, etc. (not shown in the drawings) are also mounted on the motor-side surface 471 or on the cover-side surface 472.

Figure 4:
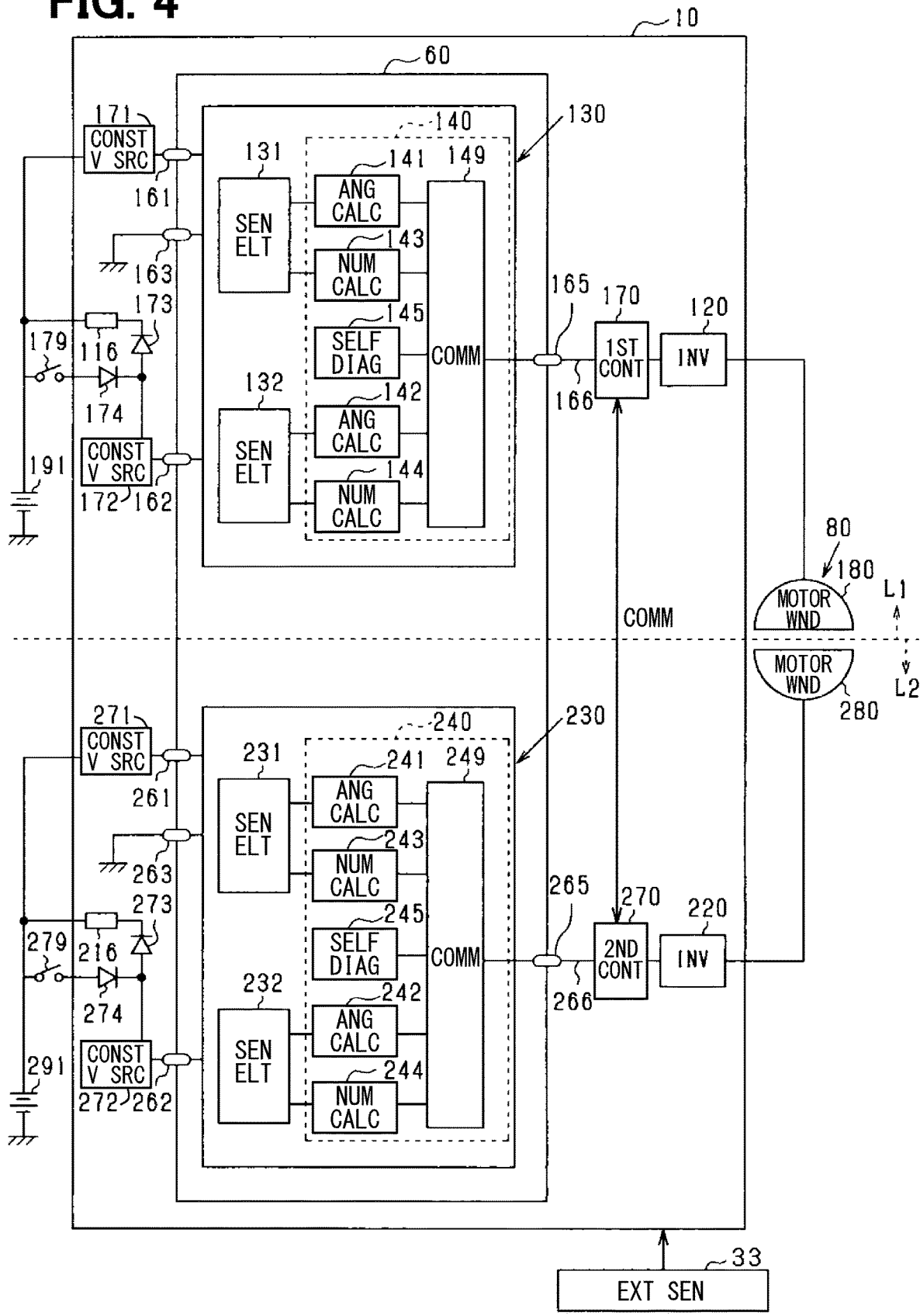
FIG. 4 is a block diagram of a drive device provided with the motor controller according to the first embodiment of the present disclosure.

As shown in FIG. 4, the ECU 10 is electrically connected to the motor 80, to the first power source 191, and to the second power source 291. The ECU 10 includes a sensor package 60, the first inverter 120 and the second inverter 220, the first control unit 170, the second control unit 270, and the like.

The external sensor 33 is a sensor provided outside the first system L1 and outside the second system L2, for detecting at least one of a steering angle and a turning angle as steer angle information. The external sensor 33 receives electric power supplied from a different power source, than a power source supplying electric power to the sensor elements 131, 132, 231 and 232, and the external sensor 33 is installed outside the ECU 10. The external sensor 33 includes at least one of a stroke sensor that detects turning angle information, a torque sensor that detects steering torque, and a steering angle sensor that detects steering angle information, which are disposed in a vehicle. For example, when the external sensor 33 is a rack stroke sensor, the turning angle can be calculated based on the detected displacement amount of the rack shaft 97. For example, when the external sensor 33 is a torque sensor, the steering angle can be calculated based on the detected rotational torque of the steering shaft 92. Further, for example, when the external sensor 33 is a steering angle sensor that detects the rotation angle of the steering shaft 92, the steering angle can be calculated from the detected rotation angle.

In the first embodiment, an example is described in which the external sensor 33 is a steering angle sensor capable of detecting a rotation angle of the steering shaft 92 and obtaining a steering angle. The steering angle sensor may be, for example, a device having a main gear that rotates in conjunction with the steering shaft 92, a detection gear to which the rotation operation of the main gear is transmitted, and a magnetic sensor that detects a rotation angle of a magnet mounted on the detection gear.

The first detection circuit 130 and the second detection circuit 230 are provided in one sensor package 60. The sensor package 60 is mounted on a circuit board (not shown) at a position where it can detect the magnetic field of the magnet 875 that rotates integrally with the shaft 870 of the motor 80. By forming the detection circuits 130 and 230 in one package, the mounting area size can be reduced. Alternatively, a package may be provided for each of the detection circuits 130 and 230. The sensor package 60 is provided with power terminals 161, 162, 261, 262, ground terminals 163, 263, and communication terminals 165, 265.

The power terminal 161 is connected to the first power source 191 via a constant voltage source 171. The power terminal 162 is connected to the first power source 191 via a constant voltage source 172. The constant voltage source 172 is connected to the first power source 191 via a power source circuit 116 and a diode 173. The constant voltage source 172 is also connected to the first power source 191 via a switch 179 and a diode 174. The diode 174 allows electric current to flow from the first power source 191 to the constant voltage source 172, and is arranged in a direction to prohibit a flow of a reverse current. The power terminal 261 is connected to the second power source 291 via a constant voltage source 271. The power terminal 262 is connected to the second power source 291 via a constant voltage source 272. The constant voltage source 272 is connected to the second power source 291 via a power source circuit 216 and a diode 273. The constant voltage source 272 is also connected to the second power source 291 via a switch 279 and a diode 274. The diode 274 allows electric current to flow from the second power source 291 to the constant voltage source 272, and is arranged in a direction to prohibit a flow of a reverse current.

The switches 179, 279 are turned ON and OFF in synchronization with a start switch of the vehicle. One of the switches 179, 279 may be the start switch itself. The start switch of the present embodiment is an ignition switch. Hereinafter, the ignition switch may be referred to as "IG," and the ON/OFF of the switches 179 and 279 may be described as ON/OFF of the IG. In addition, a state in which the IG is turned OFF is referred to as "system stop."

The constant voltage sources 171, 172, 271, and 272 are regulators or the like that consume a small amount of electric power (e.g., several mA) so as to be capable of driving the detection circuits 130 and 230. Power supply to the detection circuits 130 and 230 is continued via the constant voltage sources 171 and 271 even while the IG is OFF. The ground terminals 163 and 263 are connected to the ground.

The first detection circuit 130 and the first control unit 170 are connected to be capable of sending and receiving signals via the communication terminal 165 and a communication line 166. The second detection circuit 230 and the second control unit 270 are connected to be capable of sending and receiving signals via the communication terminal 265 and a communication line 266. The first detection circuit 130 includes sensor elements 131 and 132 and a circuit unit 140. The second detection circuit 230 includes sensor elements 231 and 232 and a circuit unit 240.

The sensor elements 131 and 132 correspond to a first angle sensor that detects the rotation of the motor 80. The sensor elements 231 and 232 correspond to a second angle sensor that detects the rotation of the motor 80. The sensor elements 131, 132, 231, and 232 are magnetic detection elements that detect a change in magnetic field accompanying rotation of a magnet that rotates integrally with the shaft 870 of the motor 80. The sensor elements 131, 132, 231, 232 are, for example, MR elements GMR, AMR, TMR, or the like, or Hall elements of the same type, or different types. For example, the sensor elements 131 and 231 may be GMR elements, and the sensor elements 132 and 232 may be Hall elements. In such configuration, two sensor elements in one detection circuit are implemented as different type detectors, providing redundancy while enabling improvement of robustness by respectively providing different type detection information. As the detection values of the sensor elements 131, 132, 231, and 232, values obtained by AD conversion are used as required.

The circuit unit 140 includes angle calculators 141 and 142 as a first calculator, number calculators 143 and 144 as a second calculator, a self-diagnosis unit 145, and a communication unit 149. The circuit unit 240 includes angle calculators 241 and 242 as a first calculator, number calculators 243 and 244 as a second calculator, a self-diagnosis unit 245, and a communication unit 249. The angle calculator 141 calculates a rotation angle $\theta m11$ of the motor 80 based on a detection value of the sensor element 131. The angle calculator 142 calculates a rotation angle $\theta m12$ of the motor 80 based on a detection value of the sensor element 132. The angle calculator 241 calculates a rotation angle $\theta m21$ of the motor 80 based on a detection value of the sensor element 231. The angle calculator 242 calculates a rotation angle $\theta m22$ of the motor 80 based on a detection value of the sensor element 232.

The values calculated by the angle calculators 141, 142, 241, 242 are not limited to the rotation angle $\theta m$, but may be any value that enables the first control unit 170 to calculate the rotation angle $\theta m$. Hereinafter, the calculation of the angle calculator, including the above-described case, may simply be referred to as a "rotation angle calculation." The same applies to the calculation of the number of rotations TC. In the present embodiment, the rotation angle $\theta m$ is a mechanical angle, but it may also be an electric angle.

The number calculator 143 calculates a number of rotations TC11 of the motor 80 based on the detection value of the sensor element 131. The number calculator 144 calculates a number of rotations TC12 of the motor 80 based on the detection value of the sensor element 132. The number calculator 243 calculates a number of rotations TC21 of the motor 80 based on the detection value of the sensor element 231. The number calculator 244 calculates a number of rotations TC22 of the motor 80 based on the detection value of the sensor element 232.

The number of rotations TC can be calculated based on a count value, for example, by dividing one rotation (i.e., 360 degrees) of the motor 80 into three or more regions, and counting up or down according to the rotation direction each time the region changes. The rotation direction of the motor 80 is determinable by setting a division number div of one rotation of the motor 80 to 3 or more. In addition, by setting the division number div of one rotation to five or more regions, it is possible to determine the rotation direction of the motor 80 even when a region count is mis-detected (i.e., skipped). Further, the number of rotations TC may be calculated from the rotation angle θm. Here, "the number of rotations" in the present specification is not a so-called number of rotations per minute (i.e., rotation speed) represented by a unit rpm or the like, but a value representing "how many rotations of the rotor have been made. The rotation angle θm and the number of rotations TC correspond to a rotation detection value of the motor 80. The number of rotations may also be designated, in the following, as rotation number, e.g., a rotation number TC.

The self-diagnosis unit 145 monitors a power source abnormality such as a short circuit of a power source or a ground fault regarding the sensor elements 131 and 132, the angle calculators 141 and 142, and/or the number calculators 143 and 144. Further, by monitoring an operation abnormality of an IC internal circuit of the first detection circuit 130, the abnormality of the rotation angle θm11 is monitored. For example, as a method of detecting an abnormality in the rotation angle θm11 due to an abnormality of the calculation circuit and/or the detection circuit that detects the outputs of the sensor elements 131 and 132 in the first detection circuit 130, the rotation angles θm11 and θm12 are compared with each other, which enables a detection of intermediate abnormalities such as an offset abnormality and the like. Further, for example, as a method of detecting an abnormality in the number of rotations TC11 due to an abnormality of the calculation circuit and/or the detection circuit that detects the outputs of the sensor elements 131, 132 in the first detection circuit 130, the numbers of rotations TC11 and TC12 are compared with each other, which enables a detection of intermediate abnormalities such as an offset abnormality and the like.

The self-diagnosis unit 245 monitors a power source abnormality such as a short circuit of a power source or a ground fault regarding the sensor elements 231 and 232, the angle calculators 241 and 242, and the number calculators 243 and 244. Further, by monitoring an operation abnormality of an IC internal circuit of the second detection circuit 230, the abnormality of the rotation angle θm21 is monitored. For example, as a method of detecting an abnormality in the rotation angle θm21 due to an abnormality of the calculation circuit and/or the detection circuit that detects the outputs of the sensor elements 231 and 232 in the second detection circuit 230, the rotation angles θm21 and θm22 are compared with each other, which enables a detection of intermediate abnormalities such as an offset abnormality and the like. Further, for example, as a method of detecting an abnormality in the number of rotations TC21 due to an abnormality of the calculation circuit and/or the detection circuit of the output of the sensor elements 231, 232 in the second detection circuit 230, the numbers of rotations TC21 and TC22 are compared with each other, which enables a detection of intermediate abnormalities such as an offset abnormality and the like.

The self-diagnosis method of the self-diagnosis units 145 and 245 is not limited to the above-described method, but may also be any method other than the above. The self-diagnosis result of the self-diagnosis units 145, 245 is reflected in a status signal.

Further, instead of the abnormality monitoring by the comparison of the rotation angles θm11 and θm12 or by the comparison of the number of rotations TC11 and TC12 in the self-diagnosis unit 145, the first control unit 170 may perform abnormality monitoring by the comparison of the rotation angles θm11 and θm12, or by the comparison of the numbers of rotations TC11 and TC12. Similarly, instead of the abnormality monitoring by the comparison of the rotation angles θm21 and θm22 or by the comparison of the number of rotations TC21 and TC22 in the self-diagnosis unit 245, the second control unit 270 may perform abnormality monitoring by the comparison of the rotation angles θm21 and θm22, or by the comparison of the numbers of rotations TC21 and TC22.

The communication unit 149 generates an output signal including a rotation angle signal related to the rotation angle θm and a rotation number signal related to the rotation number TC. The rotation number TC is an alternative expression of the number of rotations TC. The generated output signal is output to the first control unit 170 by digital communication such as SPI (Serial Peripheral Interface) communication or the like.

The communication unit 249 generates an output signal including a rotation angle signal related to the rotation angle θm and a rotation number signal related to the rotation number TC. The generated output signal is output to the second control unit 270 via the communication terminal 265 and the communication line 266 by digital communication such as SPI communication or the like.

In the present embodiment, electric power is constantly (i.e., without interruption) supplied from the first power source 191 to the sensor element 131, to the number calculator 143, and to the self-diagnosis unit 145 via the power terminal 161. In addition, when the power source circuit 116 or the switch 179 is turned ON, the sensor element 132, the angle calculators 141 and 142, the number calculator 144, and the communication unit 149 are supplied with electric power from the first power source 191, and, when the power source circuit 116 and the switch 179 are turned OFF, the sensor element 132, the angle calculators 141 and 142, the number calculator 144, and the communication unit 149 do not receive a supply of electric power, and thereby stop their operation.

Further, electric power is constantly (i.e., without interruption) supplied from the second power source 291 to the sensor element 231, to the number calculator 243, and to the self-diagnosis unit 245 via the power terminal 261. Further, when the power source circuit 216 or the switch 279 is turned ON, the sensor element 232, the angle calculators 241 and 242, the number calculator 244, and the communication unit 249 are supplied with electric power from the second power source 291, and, when the power source circuit 216 and the switch 279 are turned OFF, the sensor element 232, the angle calculators 241 and 242, the number calculator 244, and the communication unit 249 do not receive a supply of electric power, thereby stop their operation.

The first power source 191, the first control unit 170, and the first detection circuit 130 that constitute the first system L1 are electrically connected to each other. The second power source 291, the second control unit 270, and the second detection circuit 230 that constitute the second system L2 are electrically connected to each other. The first control unit 170 and the second control unit 270 can perform bidirectional communication.

The first control unit 170 can obtain, from the first detection circuit 130, first rotation number information including the detection value of a rotation number TC1 and first rotation angle information including the detection value of a rotation angle θm1. The second control unit 270 can obtain, from the second detection circuit 230, second rotation number information including the detection value of a rotation number TC2 and second rotation angle information including the detection value of a rotation angle θm2. The first control unit 170 can obtain the second rotation number information and the second rotation angle information from the second control unit 270 by bidirectional communication. The second control unit 270 can obtain the first rotation number information and the first rotation angle information from the first control unit 170.

The ECU 10 includes a detection unit 11, an abnormality determiner 12, a steer angle calculator 13, and a control amount calculator 14. The ECU 10 is provided with a central processing unit Central Processing Unit (CPU) and a memory (ROM, RAM) not shown, and when the CPU executes a program stored in the memory, the above functions are obtained and the motor 80 is controlled.

The detection unit 11 obtains the rotation number information and the rotation angle information of the motor 80 based on the outputs from the plurality of sensor elements 131, 132, 231, 232. Further, the detection unit 11 obtains, from the external sensor 33, steer angle information related to the steering of the vehicle. That is, the detection unit 11 has a function as a steer angle information obtainer. The steer angle information can be obtained as the steer angle information including, for example, a detection value of the steering angle of the steering shaft 92 or a detection value of the turning angle of the steered wheels (i.e., wheels 98) calculated based on the displacement amount of the rack shaft 97.

The detection unit 11 may be configured to set the rotation number TC1 as the first rotation number information based on a comparison between the rotation numbers TC11 and TC12 detected at the same time by the sensor elements 131 and 132. Specifically, for example, when a difference between the rotation number TC11 and the rotation number TC12 is smaller than a predetermined threshold D1 (i.e., when |TC11−TC12|<D1), it may be determined that TC11 is normal, and TC1=TC11 may be set. Similarly, the detection unit 11 may be configured to set the rotation number TC2 as the second rotation number information, based on a comparison between the rotation numbers TC21 and TC22 detected at the same time by the sensor elements 231 and 232.

For example, the abnormality determiner 12 may determine abnormality of the rotation number or the steering angle, based on (i) the rotation number TC1 and TC2 currently (i.e., at the same time) obtained as the rotation number information from the first detection circuit 130 and the second detection circuit 230 and (ii) a steering angle A3 currently (i.e., at the same time) obtained from the external sensor 33, by comparing them with each other and by determining that one of them has a lower degree of matching.

The comparison of the degrees of matching may be performed by, for example, calculating steering angles A1 and A2 based on the rotation numbers TC1 and TC2, and comparing the three steering angles A1 to A3 with each other. More specifically, it may be determined that a subject steering angle is normal when a sum total of differences with two other steering angles is less than a preset threshold value, considering that the subject steering angle has a higher-than threshold degree of matching, and that the subject steering angle is abnormal when a sum total of differences with two other steering angles is equal to or greater than the preset threshold value, considering it as a lower-than threshold degree of matching. Alternatively, for example, by performing a statistical processing, when a subject steering angle has a deviation of greater than preset range from the average of the three angles, it may be determined that the subject steering angle has a lower-than preset degree of matching.

The comparison of the degrees of matching may be performed by comparing the two, i.e., the rotation numbers TC1 and TC2 first, then by comparing the result of first comparison with the steering angle A3. For example, after comparing the rotation numbers TC1 and TC2, the steering angle A1 may be calculated from the rotation number TC1 and compared with the steering angle A3. In such a case, the comparison between the rotation number TC1 and the rotation number TC2 may be considered as a comparison of the same characteristics, or the comparison, after conversion from the rotation numbers to the steering angles, between the steering angles A1 and A2 may be considered as a comparison of the same characteristics.

The steer angle calculator 13 calculates the steering angle A1 based on the rotation angle θm1 and the rotation number TC1. Further, the steer angle calculator 13 calculates the steering angle A2 based on the rotation angle θm2 and the rotation number TC2. Note that an absolute angle A is calculable from a rotation angle θm and the rotation number TC using the following equation (1).

$$A = \text{INT}(TC/k) \times 360 + \theta m \quad (1)$$

In the above-described equation (1), "INT (TC/k)" represents an integer part of a quotient (TC/k) obtained by dividing the rotation number TC by k, which is the rotation number TC per one rotation of the motor 80. For example, k is 4 if a count interval for determining an angle region of the rotation number TC is 90°.

The control amount calculator 14 calculates an instruction value of torque for the motor 80, i.e., a steering torque instruction value, based on a steering side absolute angle Y1 indicating a rotation amount (i.e., in an absolute angle) of the steering shaft 92 accompanying the driver's steering operation, a steering torque Th and a vehicle speed Vc. The steering angle calculated by the steer angle calculator 13 is used as the steering side absolute angle Y1. Further, based on the steering torque instruction value, a control signal for controlling the motor 80 (more specifically, an operation signal for operating the inverter) is calculated.

The steering side absolute angle Y1 is a rotation angle of the steering shaft 92 ranging (i) from a zero angle, i.e., a neutral position for a straight travel of the vehicle (ii) up to a maximum angle corresponding to a rightmost or leftmost wheel turning angle, for the turning of the wheels 98.

When it is determined that a plurality of steering angles among the steering angles A1 to A3 are normal, the control amount calculator 14 may select a steering angle having higher accuracy for use in a control of the motor 80. The accuracy of the steering angles A1 to A3 may be determined in consideration of the detection accuracy of the sensor elements 131, 132, 231, 232 and the external sensor 33.

The detection unit 11, the abnormality determiner 12, the steer angle calculator 13, and the control amount calculator 14 may be included in the first control unit 170 or may be included in the second control unit 270. Alternatively, the detection unit 11, the abnormality determiner 12, the steer angle calculator 13, and the control amount calculator 14 may separately be provided from the first control unit 170 and the second control unit 270 in the ECU 10.

Figure 5:
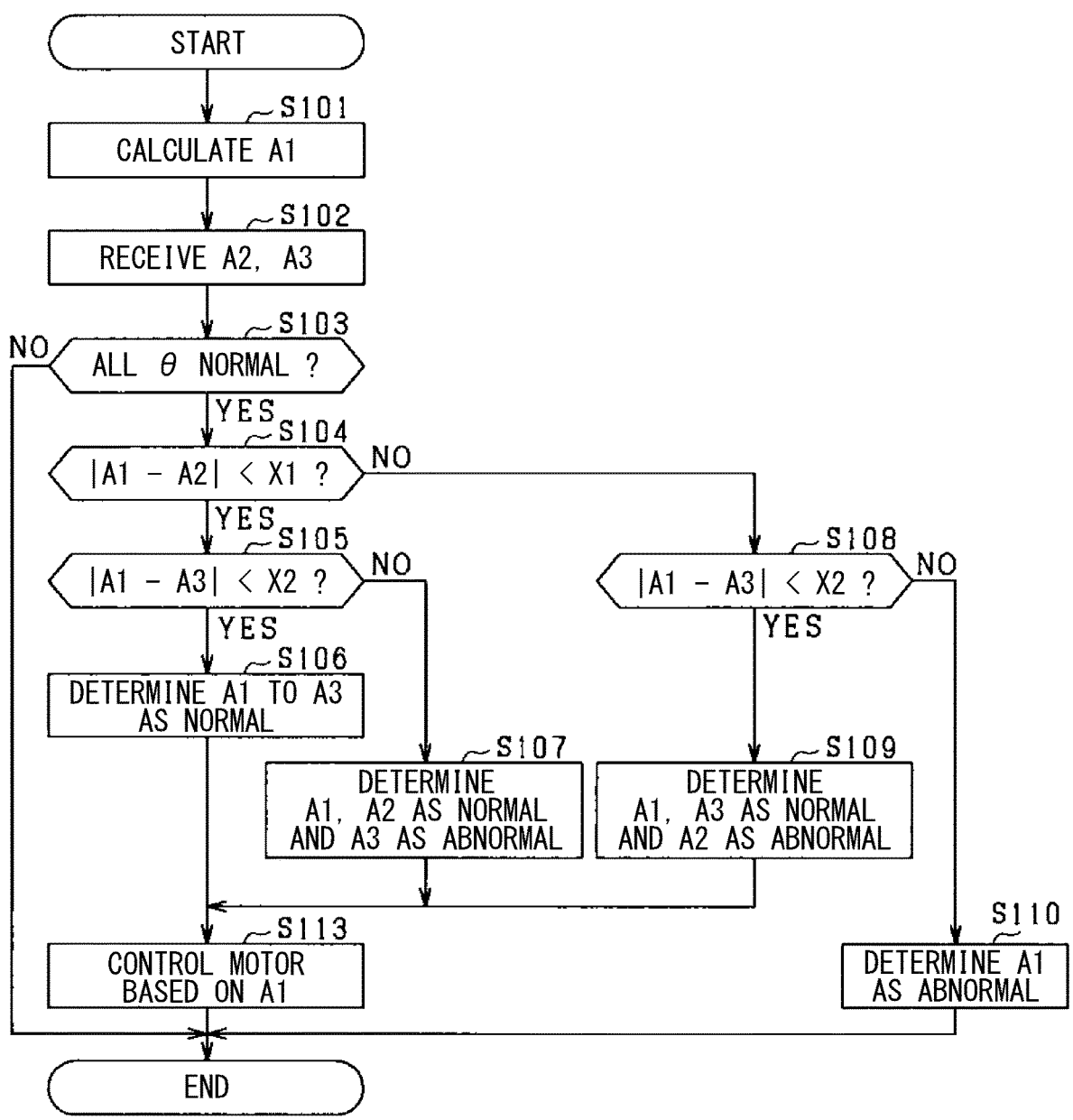
FIG. 5 is a flowchart of an abnormality determination process according to the first embodiment of the present disclosure.

FIG. 5 shows a flow of an abnormality determination process performed by the first control unit 170 of the ECU 10 when the motor 80 is driven. The process shown in FIG. 5 is repeatedly performed when the motor 80 is driven. Note that the external sensor 33 is, in the following example, a steering angle sensor for detecting a rotation angle of the steering wheel 91, and for calculating a steering angle of the steering shaft 92 based on the detected rotation angle.

In step S101, the steering angle A1 is calculated based on the rotation number TC1 obtained by the first detection circuit 130, and then the process proceeds to step S102.

In step S102, the steering angle A2 and the steering angle A3 calculated or detected by other system (i.e., other system and external sensor) are received. In the present embodiment, the steering angle A2 is a steering angle calculated by the second detection circuit 230 based on the rotation number TC2. The steering angle A3 is an angle A3 detected by a steering angle sensor which is the external sensor 33.

In step S103, it is determined whether all of the rotation angle θm1 of the motor 80 obtained in the subject system (i.e., the first system L1), and the rotation angle obtained in the other system, that is, the rotation angle θm2 of the motor 80 obtained in the second system L2, and the rotation angle θm3 of the steering shaft 92 obtained by the external sensor 33 are all normal. Specifically, the rotational angles θm1 to θm3 are respectively converted to same characteristics values, which are comparable with each other, and the difference (i.e., rotational angle differences) among those values are calculated. Then, when the calculated rotation angle differences are less than the predetermined rotation angle threshold value X5, it is determined that the rotation angles θm1 to θm3 are all normal. If at least one of the rotation angle differences is equal to or greater than the rotation angle threshold value X5, it is determined that the operation is not normal (i.e., abnormal). In step S103, when it is determined that all rotation angles θm1 to θm3 are normal, the process proceeds to step S104, when it is determined not all angles are determined as normal, the process ends without performing steps after step S104.

In step S104, it is determined whether a difference between the steering angle A1 and the steering angle A2 is less than a predetermined first threshold value X1. When |A1−A2|<X1, the process proceeds to step S105. When |A1−A2|≥X1, the process proceeds to step S108.

In step S105, it is determined whether a difference between the steering angle A1 and the steering angle A3 is less than a predetermined second threshold value X2. When |A1−A3|<X2, the process proceeds to step S106, and after determining that all the steering angles A1 to A3 are normal, the process proceeds to step S113. When |A1−A3|≥X2, the process proceeds to step S107, the steering angles A1 and A2 are determined as normal, and the steering angle A3 is determined as abnormal, then the process proceeds to step S113.

In step S108, it is determined whether a difference between the steering angle A1 and the steering angle A3 is less than a predetermined second threshold value X2. When |A1−A3|<X2, the process proceeds to step S109, determines that the steering angles A1 and A3 are normal, determines that the steering angle A2 is abnormal, and then proceeds to step S113. When |A1−A3|≥X2, the process proceeds to step S110, and after determining that the steering angle A1 is abnormal, the process ends.

In step S113, control of the motor 80 is performed based on the steering angle A1 determined as normal. On the other hand, as shown in steps S108 and S110, when it is determined that the steering angle A1 is abnormal, the first control unit 170 does not perform the control of the motor 80.

The predetermined threshold values X1 and X2 may be set to the numbers of rotations obtained by the first detection circuit 130 and the second detection circuit 230 at the time of driving the motor 80 in the past, or may be set to a value range considered as normal based on a history of a steering angle obtained by the external sensor 33 or the like, for example.

As described above, according to the first embodiment, the first control unit 170 compares (i) the steering angles A1 and A2 calculated from the rotation number TC1 and TC2 in the first system L1 and the second system L2 and (ii) the steering angles A3 obtained from the external sensor 33, with each other. Since the rotation numbers TC1 and TC2 in the two systems L1 and L2 and the steering angle A3 in the external sensor 33 disposed outside the ECU 10 are used for the abnormality determination, i.e., the determination is made based on three or more detection values obtained from different systems, even when the detection value (for example, the rotation number TC1) is an abnormal value due to the occurrence of an abnormality in one system (for example, in the first system L1), the detection values (for example, the rotation number TC2, the steering angle A3) from the other system (for example, the second system L2 and the external sensor 33) are not susceptible to abnormality of a different system, i.e., are not prone to take abnormal values. Therefore, the accuracy of the abnormality determination can be improved.

Further, when a difference between the steering angle A1 and the steering angle A2 is equal to or greater than the first threshold value in a comparison between A1 and A2 and abnormality of the steering angle A1 is suspected, a comparison between the steering angle A1 and the steering angle A3 is also performed. Then, by comparing the difference between the steering angle A1 and the steering angle A3 with the second threshold value X2, it can be accurately determined whether or not the steering angle A1 is normal. Therefore, it is not necessary to treat the steering angle A1 as downgraded, and, when controlling the motor 80 using the steering angle A1, it is not necessary to stop a part of functions concerning the control. As a result, continuity in control of the motor 80 in the steering system 90 can be secured.

In FIG. 5, although the process ends when the negative determination is made in step S103, the process may be ended after the following process is performed. For example, a notification process of occurrence of abnormality to the system (for example, a sensor element, a detection circuit, an external sensor) which obtains the rotation angle determined as abnormal among the rotation angles θm1 to θm3, an invalidation process of the obtained rotation number information and the steer angle information, and an operation restriction process for the relevant system and the like may be performed. Specifically, for example, when the rotation angle m1 is determined as abnormal, a process notifying the occurrence of abnormality to the first control unit 170 of the first system L1, or a process invalidating the detection value obtained from the first detection circuit 130, and/or a process restricting or prohibiting the control of the motor 80 by the first control unit 170 may be performed.

Modification

The processes described above with reference to FIG. 5 may be configured to be performable by the second control unit 270 as well. The second control unit 270 can determine whether the steering angle A2 is normal by replacing the steering angle A1 and the steering angle A2 in the process performed in FIG. 5. When the abnormality determination is made for the steering angle A1 and the normal determination is made for the steering angle A2, the control of the motor 80 using the steering angle A2 may be performed by the second control unit 270. With such a configuration, even when it is determined that the steering angle A1 is abnormal, the control of the motor 80 can be performed based on the steering angle A2 without stopping the functions constituting a part of the control. Therefore, the continuity in the control of the motor 80 can be further improved.

Note that, when the first control unit 170 determines that the steering angle A1 is normal and the second control unit 270 determines that the steering angle A2 is normal, one of them (for example, the first control unit 170 and the steering angle A1) may be prioritized to the other (for example, the second control unit 270 and the steering angle A2), according to a preset configuration. Alternatively, one of the steering angle A1 and the steering angle A2 determined as more accurate may be selected. In such a case, among the steering angles A1 and A2, one closer to the steering angle A3 may be determined as more accurate, and may be used preferentially for the control of the motor 80.

Second Embodiment

Figure 6:
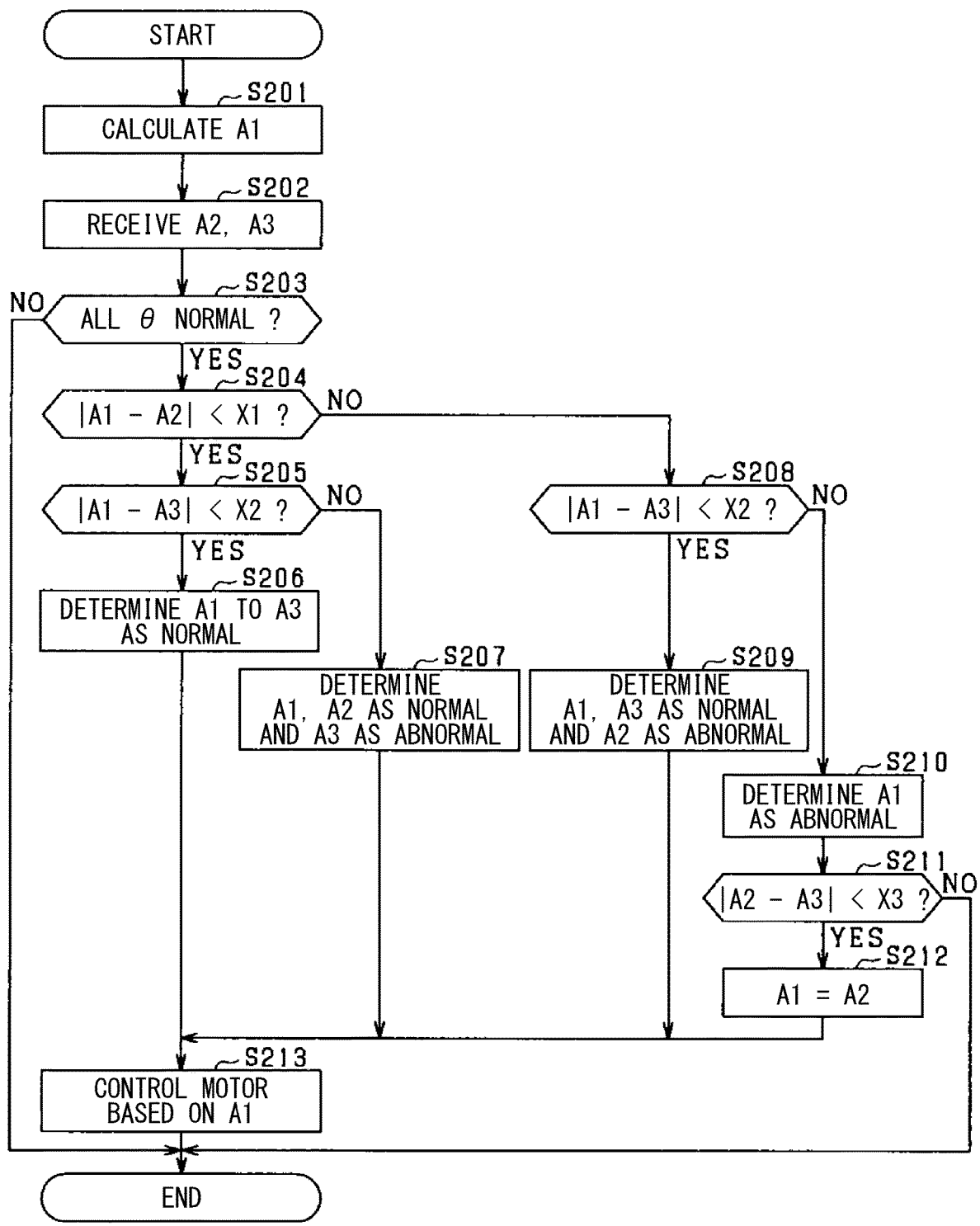
FIG. 6 is a flowchart of the abnormality determination process according to a second embodiment of the present disclosure.

FIG. 6 shows a flow of abnormality determination process in the second embodiment, performed by the first control unit 170 of the ECU 10 at the time of driving the motor 80. The second embodiment is different from the first embodiment in the processing after the steering angle A1 is determined as abnormal. As shown in FIG. 6, the processing of steps S201 to S209 and S213 is the same as that of FIG. 5, description of the same processing is omitted.

In step S210, after it is determined that the steering angle A1 is abnormal, the process proceeds to step S211. In step S211, it is determined whether a difference between the steering angle A2 and the steering angle A3 is less than a predetermined third threshold value X3. When |A2−A3|<X3, the process proceeds to step S 212, performs a process for replacing the steering angle A1 with the steering angle A2 (i.e., A1=A2), and the process proceeds to step S213. When |A2−A3|≥X3, the process ends.

The third threshold value X3 is set, for example, based on the numbers of rotations obtained by the first detection circuit 130 and the second detection circuit 230 at the time of driving the motor 80 in the past, a history of steering angles obtained by the external sensor 33, or the like, within a range determinable as normal. The third threshold value X3 may be set to the same value as the second threshold value X2.

As described above, according to the second embodiment, the first control unit 170 further compares the steering angle A2 with the steering angle A3 when the abnormality determination is made for the steering angle A1 for the determination of whether the steering angle A2 is normal. When it is determined that the steering angle A2 is normal, the steering angle A1 is replaced with the steering angle A2, and the control of the motor 80 is performed based on the steering angle A2. Therefore, the motor 80 can be controlled based on the steering angle A1 (after replacement by the steering angle A2) whose accuracy is guaranteed. That is, based on the replaced steering angle A1, the control of the motor 80 can be performed without stopping part of the functions in the control. Therefore, the continuity in the control of the motor 80 can be further improved.

Further, as described in the modification of the first embodiment, the second control unit 270 does not need to perform the same control, thereby reducing the processing load, which contributes to the simplification of the system.

Further, the steering angles A1 and A2 calculated from the rotation numbers TC1 and TC2 of the motor 80 detected by the sensor elements 131, 132, 231 and 232 have higher accuracy than the steering angle A3 obtained from the steering angle sensor exemplified as the external sensor 33 in the present, in general. Therefore, by giving priority to steering angle A1 and steering angle A2 than to the steering angle A3 and using A1/A2 for the control of the motor 80, the accuracy in the control of the motor 80 can be made higher, i.e., improved. However, when the external sensor 33 has high accuracy and the steering angle A3, e.g., having higher accuracy than the steering angles A1 and A2, priority may be switched to the steering angle A3, i.e., using A3 for the control of the motor 80.

In each of the above embodiments, an example of the steering system 90 including the ECU 10 as the motor controller is described as a "column assist type." However, the present disclosure is not limited to such a configuration. For example, the steering system 90 may be a different type such as a "rack assist type," which transmits the rotation of the motor 80 to the rack shaft 97.

Third Embodiment

Figure 7:
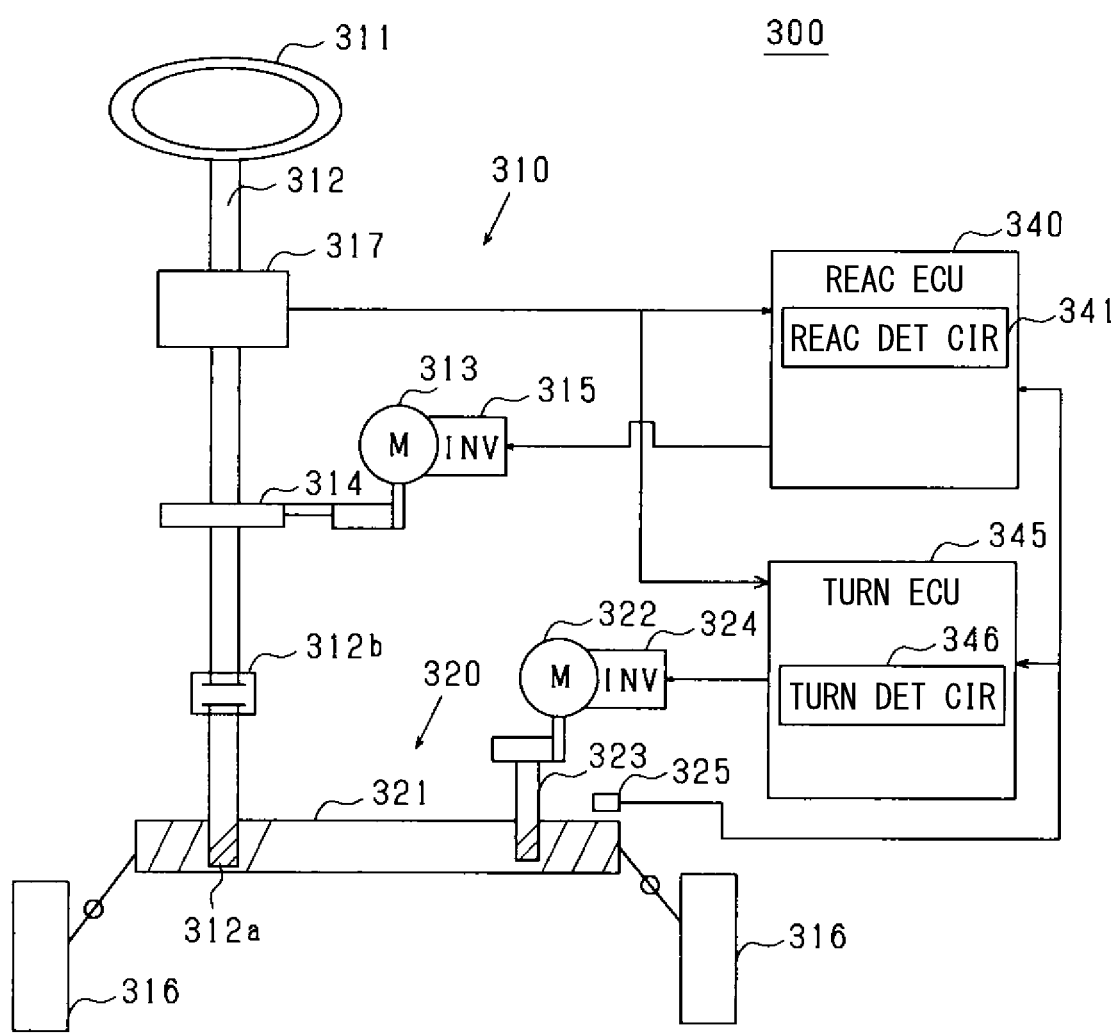
FIG. 7 is a schematic configuration diagram of the steering system provided with the motor controller according to a modification of the second embodiment of the present disclosure.

The steering system may include both of a reaction force motor and a turning motor, as shown in FIG. 7. Also in the reaction force motor and the turning motor, the abnormality determination process can be performed as described in the above embodiments. In addition, as an external sensor 33 used for detecting a turning angle, the sensor for detecting a turning angle, such as a rack stroke sensor, can be exemplified.

A steering system 300 shown in FIG. 7 is a so-called steer-by-wire steering system. The steering system 300 includes a reaction force device 310 that receives the driver's steering operation, and a turning device 320 that turns, i.e., changes a direction of wheels 316 according to the amount of steering received by the reaction force device 310.

The reaction force device 310 includes a steering wheel 311 which is rotated by the operation of the driver, a steering shaft 312 which is rotated according to the rotation of the steering wheel 311, and a reaction force motor 313 used, in part, as a steering motor. The reaction force motor 313 is connected to the steering shaft 312 via a reaction force speed reducer 314, and applies a reaction force according to the driver's operation of the steering wheel 311. The reaction force motor 313 is an alternating current (AC) motor which is driven, i.e., rotated, by an AC electric power. In addition, the reaction force motor 313 is connected to a power supply via an inverter 315. The inverter 315 converts a direct current (DC) electric power from the power supply into an AC power and supplies the electric power to the reaction force motor 313.

A pinion shaft 312a is provided on a tip end of the steering shaft 312 via a clutch 312b. During a normal operation of the vehicle, the clutch 312b is in an open state, and the rotation of the steering shaft 312 is not transmitted to the pinion shaft 312a. For example, when the clutch 312b is closed due to an abnormality or the like of the steering system 300, the rotation of the steering shaft 312 is transmitted to the pinion shaft 312a.

The turning device 320 includes a rack shaft 321 that changes the direction of the wheels 316, and a turning motor 322. The wheels 316 are connected to both ends of the rack shaft 321 via tie rods. The turning motor 322 is connected to the rack shaft 321 via a turning speed reducer 323, and applies a steering turning force that is a force to change the direction of the wheel 316 to the rack shaft 321. The turning motor 322 is connected to a power source via an inverter 324. The inverter 324 converts the DC electric power from the power source to the AC electric power, and supplies electric power to the turning motor 322.

The pinion shaft 312a engages with the rack shaft 321, and when the clutch 312b is in the open state, the steering shaft 312 is not mechanically connected to the rack shaft 321. Therefore, the rotation of the steering shaft 312 accompanying the driver's operation of the steering wheel 311 is not converted to the linear movement of the rack shaft 321. On the other hand, in the closed state of the clutch 312b, the steering shaft 312 is mechanically connected to the rack shaft 321. Therefore, the rotation movement of the steering shaft 312 accompanying the driver's operation of the steering wheel 311 is converted into the linear movement of the rack shaft 321.

The steering shaft 312 of the steering device 310 is provided with a torque sensor 317 that detects a steering torque according to the driver's steering operation. Further, on the rack shaft 321 of the turning device 320, a rack stroke sensor 325 which detects a displacement amount X indicative of a linear movement amount of the rack shaft 321 is provided.

The steering system 300 includes a steering ECU 340 as a reaction force control unit and a turning ECU 345 as a turning control unit. The steering ECU 340 and the turning ECU 345 respectively include a central processing unit (CPU) and a memory (e.g., ROM, RAM), and the CPU executes a program stored in the memory to control a supply of electric power to the reaction force motor 313 and the turning motor 322.

The steering ECU 340 calculates a steering torque instruction value which is an instruction value of a torque to the reaction force motor 313, based on a steering absolute angle Y1 indicating the rotation amount (i.e., an absolute angle) of the steering shaft 312 accompanying the driver's steering operation, the steering torque Th and the vehicle speed Vc. Further, based on the steering torque instruction value, an operation signal for operating the inverter 315 is calculated. The absolute angle Y1 described above has a value that indicates a rotation angle of the steering wheel 311, from its neutral position to a right or left limit, corresponding to the turning of the wheel 316 turned from a straight travel position either to a left or right turning limit angle.

The reaction force ECU 340 includes, as a rotation detection circuit, a reaction force detection circuit 341 that calculates the steering absolute angle Y1 based on a detection value indicating a rotation state of the reaction force motor 313. The reaction force detection circuit 341 calculates, as detection values, the rotation angle θm of the reaction force motor 313 and the rotation number TC indicating the number of rotations of the reaction force motor 313, counted by a unit of a predetermined angle. For example, the reaction force motor 313 is provided with a magnet that rotates integrally with a rotor or a rotation shaft, and the reaction force detection circuit 341 calculates the rotation angle θm and the rotation number TC that indicates the number of rotations of the reaction force motor 313 by a unit of predetermined angle. For example, the reaction force motor 313 may have a magnet rotating with the rotor or rotation shaft, and the reaction force detection circuit 341 may detect a change of magnetic field by the rotation of the magnet, for the calculation of the rotation angle θm and the rotation number TC. The steering ECU 340 can be configured to connect to the power source via the power supply path and the communication path similar to the ones described in the above embodiments, for performing similar processing.

The turning ECU 345 calculates, as an instruction value of a torque for the turning motor 322, a turning torque instruction value based on a turning absolute angle Y2 indicating the rotation amount (i.e., an absolute angle) of the steering shaft 312, the displacement amount X, the steering torque Th, and the vehicle speed Vc. Then, based on the turning torque instruction value, an operation signal for operating the inverter 324 is calculated.

The turning ECU 345 includes, as a rotation detection circuit, a turning detection circuit 346 that calculates athe turning absolute angle Y2 based on a detection value indicating a rotation state of the turning motor 322. The turning detection circuit 346 calculates, as detection values, the rotation angle θm of the turning motor 322 and the rotation number TC indicating the number of rotations of the turning motor 322 by a unit of a predetermined angle. For example, the turning motor 322 is provided with a magnet that rotates integrally with the rotor or the rotation shaft, and the turning detection circuit 346 calculates the rotation angle θm and the rotation number TC of the turning motor 322, by detecting a change in the magnetic field caused by the rotation of the magnet.

The steering ECU 340 and the turning ECU 345 can be configured to have two systems, similarly to the ECU 10 of the steering device 8 in the above-described embodiments. The configurations shown in FIG. 4 may be applicable to the steering ECU 340 and the steering ECU 345, by replacing the motor 80 with the reaction force motor 313 or the turning motor 322 and replacing the ECU 10 with the steering ECU 340 or the steering ECU 345.

The reaction force ECU 340 can perform the same processing as that of the above-described embodiments and modifications. When the configuration of the steering device 8 according to each of the above-described embodiments is applied to the turning ECU 345, the external sensor 33 in FIG. 4 is (i.e., serves as) a turning angle sensor such as a rack stroke sensor or the like. Further, in each of the above-described embodiments and modifications, the "steering angle" may be replaceable with the "turning angle", and the steering angles A1 to A3 may be replaceable with turning angles B1 to B3, for performing the same process for the turning devices involving the control of the tire direction.

As described above, also in the steering system 300 in which the steering shaft 312 which is a steering mechanism is driven by the reaction force motor 313 and the rack shaft 321 which is a steered mechanism is driven by the turning motor 322, the steering ECU 340 controlling the reaction force motor 313 may be configured to provide functions related to the detection unit 11, the abnormality determiner 12, the steer angle calculator 13, and the control amount calculator 14. Similarly, the turning ECU 345 that controls the turning motor 322 may be configured to provide functions related to the detection unit 11, the abnormality determiner 12, the steer angle calculator 13, and the control amount calculator 14.

In the steering system 300, the detection values of the number of rotations and the steering angle obtained in the reaction force device 310 and the detection values of the number of rotations and the steering angle obtained in the turning device 320 are mutually exchangeable.

More specifically, the reaction force ECU 340 corresponding to the steering controller and the turning ECU 345 corresponding to the turning controller are separately provided as different components, and are configured to be capable of communicating information with each other. Through such information communication, the information on the turning direction of wheels (e.g., 316) can be used as steer angle information in the abnormality determination on the reaction force ECU 340, and the information on the reaction force side (steering side) can be used as steer angle information in the abnormality determination on the turning ECU 345. That is, the reaction force ECU 340 can use information from the turning ECU 345 as the ste related to the steering of the vehicle. Further, the turning ECU 345 can use information from the reaction force ECU 340 as the steer angle information from an external sensor that detects steer angle information related to steering of the vehicle.

For example, in the reaction force ECU 340, the abnormality determiner 12 can simultaneously compare the rotation number information including the number of rotations (TCs1, TCs2) obtained from the two systems L1 and L2 of the reaction force motor 313, the rotation number information including the number of rotations (TCr1, TCr2) of the turning motor 322, and the steer angle information including the steering angle or the turning angle from the external sensor 33, and can perform the abnormality determination for each of those information. Note that, as shown in the first embodiment and the like, each of those information is converted to a same characteristics value for the comparison, i.e., a measurement of the same property, such as, for example, the number of rotations of the reaction force motor 313, or the steering angle of the steering shaft 312. Further, the small letter suffix "s" indicates that the property is the reaction force side (i.e., steering wheel side), and the suffix "r" indicates the tire turning side.

Similarly, in the turning ECU 345, the abnormality determiner 12 compares, substantially at the same time, the rotation number information including the number of rotations (TCs1, TCs2) obtained from the two systems L1 and L2 of the reaction force motor 313, the rotation number information including a plurality of rotation numbers (TCr1, TCr2) of the turning motor 322, and the steer angle information including the steering angle or the turning angle from the external sensor 33, for performing the abnormality determination for each of those information. Note that, similar to the first embodiment and the like, each of those information is converted to a same characteristics value for the comparison, i.e., a measurement of the same property, such as, for example, the number of rotations of the turning motor 322, or the turning angle of the wheels 316. In such a configuration, the number of the detection value to be used in the abnormality determiner 12 can be increased, thereby further improving the accuracy of the abnormality determination.

Further, the steer angle calculator 13 can also calculate the turning angle from the number of rotations and the rotation angle in a similar method shown in the above-mentioned equation (1). By replacing the steering angle "A" with the turning angle "B" in the above equation (1), the turning angles B1, B2 are calculable based on the rotation angles θmr1, θmr2 of the turning motor 322 and the rotation numbers TCr1, TCr2.

Further, in the steering ECU 340, the control amount calculator 14 calculates the steering torque instruction value, which is an instruction value of a torque to the reaction force motor 313, based on the steering absolute angle Y1 indicating the amount of rotation (i.e., an absolute angle) of the steering shaft 312 accompanying the drivers steering operation, the steering torque Th and the vehicle speed Vc. As the steering absolute angle Y1, one of the steering angles A1 to A3 that has not been determined as abnormal is used. Further, based on the steering torque instruction value, an operation signal for operating the inverter 315 is calculated.

Further, in the turning ECU 345, the control amount calculator 14 calculates, as an instruction value of a torque for the turning motor 322, the turning torque instruction value based on the turning absolute angle Y2 indicating the rotation amount (i.e., an absolute angle) of the steering shaft 312, the displacement amount X, the steering torque Th, and the vehicle speed Vc. As the turning absolute angle Y2, one of the turning angles B1 to B3 that has not been determined as abnormal is used. Then, based on the turning torque instruction value, an operation signal for operating the inverter 324 is calculated.

As described above, in the steering system 300 according to the third embodiment, the first detection circuit 130 and the second detection circuit 230 detecting the rotation number information and the rotation angle information of the motors 313 and 322 are provided in the reaction force motor 313 and the turning motor 322, respectively. The reaction force ECU 340 and the steering side ECU 345 are, as the controller, provided with the abnormality determiner 12, the control amount calculator 14 and the like, respectively.

Further, the reaction force ECU 340 and the turning ECU 345 are separately provided as different components, and are configured to be capable of communicating information with each other. As a means of information communication, CAN (Controller Area Network), Wireless LAN (Local Area Network), SENT (Single Edge Nibble Transmission), PSI 5 (Peripheral Sensor Interface 5), LIN (Local Interconnect Network), and the like can be used. Via the information communication described above, in the abnormality determiners 12 in both of the reaction force ECU 340 and the steering side ECU 345, (i) two rotation numbers (TCs1, TCs2) obtained from the two systems L1 and L2 of the reaction force motor 313, (ii) a plurality of rotation numbers (TCr1, TCr2) of the turning motor 322, and (iii) the steering angle and the turning angle from the external sensor 33 are converted to the same characteristics values and compared, and the abnormality determination about each of the detection values can be performed. Therefore, the detection values usable in the abnormality determiner 12 can be increased, and the accuracy of abnormality determination can further be improved.

Note that it is not necessary that both of the reaction force device 310 and the turning device 320 have a plurality of systems such as the first system L1 and the second system L2, respectively, and only one of them may have a plurality of systems. Further, the detection unit 11, the abnormality determiner 12, the steer angle calculator 13, and the control amount calculator 14 may be provided only in one of the reaction force ECU 340 and the steering side ECU 345. The detection unit 11, the abnormality determiner 12, the steer angle calculator 13, and the control amount calculator 14 may be provided, for example, only in one of the reaction force ECU 340 and the steering side ECU 345, or may be provided in another ECU that is independent of the reaction force ECU 340 and the turning ECU 345.

In the third embodiment, the reaction force ECU 340 can use the rotation number information obtained by the first detection circuit and the second detection circuit provided in the steering side ECU 345 as the steer angle information. Similarly, the turning ECU 345 can use the rotation number information obtained by the first detection circuit and the second detection circuit provided in the reaction force ECU 340 as the steer angle information. Therefore, it is not necessary to utilize the external sensor 33 for obtaining the steer angle information as shown in the first embodiment.

The technology described in each of the above embodiments can also be applied to an automatic driving system (ADS) that automatically controls the motors 80, 313, 322 and the like without receiving an input operation from a driver or the like.

According to each of the above embodiments, the following effects are achievable.

The ECUS 10, 340, 345 include the sensor elements 131, 132, 231, 232 detecting rotation of the motors 80, 313, 322, and the first and second detection circuits 130, 230 detecting rotation number information of the motors 80, 313, 322 based on based on the outputs from the sensor elements 131, 132, 231, 232. Then, the ECUs 10, 340 and 345 obtain the first rotation number information and the second rotation number information from the first detection circuit 130 and the second detection circuit 230, respectively. Further, the ECU 10, 340, 345 obtain at least one of the steering angle and the turning angle as the steer angle information related to the steering of the vehicle from an external sensor that is different from the sensor elements 131, 132, 231, 232.

Then, after the conversion to the same characteristics values by the ECU 10, 340, 345 converting the first rotation number information, the second rotation number information, and the steer angle information by using the abnormality determiner 12, a value of either the rotation number or the steer angle having a lower degree of matching in the comparison with each other is determined as abnormal. Therefore, the abnormality determination is performable by using the steer angle information obtained from the external sensor in addition to using the plural pieces of rotation number information, thereby guaranteeing the accuracy of the abnormality determination.

Further, the accuracy of the abnormality determination can be secured, thus it is not necessary to treat the rotation number information or the steer angle information which is not determined as abnormal (i.e., information determined as normal) as downgraded information. As a result, the control amount calculator 14 can perform, i.e., can continue, the control of the motors 80, 313, 322 without stopping part of the motor control functions based on the plural pieces of information including the first rotation number information and the second rotation number information, or the steer angle information, which are not determined as abnormal by the abnormality determiner (i.e., the information determined as normal). As a result, the continuity of motor control is improved as compared with conventional technology.

Information comparison scheme may further be detailed as described below. That is, in the ECUS 10, 340, 345, when the difference between the first rotation number information and the second rotation number information is equal to or greater than a predetermined first threshold value X1, at least one of the plurality of rotation number information and the steer angle information obtained from the external sensor may be converted to the same characteristics values and compared, and it may be configured to determine which of the plurality of rotation number information is abnormal.

Further, in the ECUS 10, 340, 345, the first detection circuit 130 may detect the first rotation angle information of the motor 80 based on the sensor elements 131 and 132, and the second detection circuit 230 may detect the second rotation angle information of the motor 80 based on the sensor elements 231 and 232. In such a case, the abnormality determiner 12 may perform abnormality determination, i.e., may determine abnormality, of each of the first rotation angle information and the second rotation angle information obtained from the detection circuits 130 and 230 and the third rotation angle information related to the steer angle information obtained from the external sensor, by comparing those rotation number information with each other after conversion to the same characteristics values. In such a case, when it is determined that at least one of those pieces of rotation angle information is abnormal, the abnormality determiner 12 may be configured not to perform abnormality determination on the first rotation angle information, the second rotation number information, and the steer angle information. When an abnormality is found in the rotation angle information obtained from the detection circuits 130, 230 and the external sensor 33, by not performing the abnormality determination that compares the first rotation angle information, the second rotation number information, and the steer angle information, accuracy deterioration of the abnormality determination is preventable.

Further, when at least one of the pieces of rotation angle information is determined as abnormal, the abnormality determiner 12 may be configured to perform a notification process notifying abnormality occurrence, an invalidation process invalidating the obtained information (i.e., the first rotation angle information, the second rotation number information, and the steer angle information), and a restriction process restricting an operation of the detection circuit or the external sensor that has obtained rotation angle information determined as abnormal, in addition to not to perform the abnormality determination of the first rotation angle information, the second rotation number information, and the steer angle information as described above.

Further, in the ECU 10 and the like, the first system L1 includes the first power source 191 for supplying electric power to the first detection circuit 130 and the first control unit 170 and the second system L2 includes the second power source 291 for supplying electric power to the second detection circuit 230 and the second control unit 270. The plurality of systems L1 and L2 separately, i.e., individually or respectively, have the power sources 191 and 291 for supplying electric power to the in-system components (i.e., the detection circuit and the control unit) provided in the systems. Therefore, risk of having abnormality at the same time in both of the first rotation number information and the second rotation number information respectively obtainable from the respective systems L1, L2 is reducible.

The functions of the ECU 10 and the like serving as the motor controller described above are applicable to (i.e., usable in) the ECUs 340 and 345, which serve as a motor controller (i.e., the reaction force ECU 340, the steering side ECU 345) in a motor control system (i.e., the steering system 300) having the reaction force motor 313 that provides a reaction force to the steering member and the turning motor 322 that changes the turning amount (i.e., angle) of the wheels. In such a case, the reaction force ECU 340 may obtain the steer angle information from the turning ECU 345. In addition, the turning ECU 345 may obtain the steer angle information from the reaction force ECU 340.

In each of the above-mentioned embodiments, illustrating and explaining a two-system configuration utilizing two systems L1 and L2. However, the present disclosure is not limited to the two-system configuration, and may be configured as, for example, a motor control (i.e., steering) system having three or more systems. Further, the information that is usable as the first rotation number information or the second rotation number information is not limited to the two pieces of rotation number information, but may include three or more pieces of rotation number information. Further, the information that can be used as the steer angle information is not limited to one piece of steer angle information, and may include plural pieces of steer angle information.

What is claimed is:

1. A motor controller for controlling a motor used for steering of a vehicle, the motor controller comprising:
a first angle sensor configured to detect rotation of the motor;
a first detection circuit of a first system, in which the first system comprises a first inverter and a first winding set, the first detection circuit configured to detect rotation number information of the motor based on an output of the first angle sensor;
a second angle sensor configured to detect rotation of the motor;
a second detection circuit of a second system, in which the second system comprises a second inverter and a second winding set, the second detection circuit configured to detect rotation number information of the motor based on an output of the second angle sensor;
a steer angle information obtainer configured to obtain steer angle information from an external sensor that detects the steer angle information involving the steering of the vehicle, the steer angle information obtainer being different from the first angle sensor and from the second angle sensor;
an abnormality determiner configured to determine abnormality of information having a degree of matching lower than a preset value in each of comparisons among a first rotation number information detected by the first detection circuit, a second rotation number information detected by the second detection circuit, and the steer angle information obtained from the external sensor when the comparisons are performed after conversion to same characteristics values; and
a control amount calculator configured to calculate a control amount of the motor based on the information not determined as abnormal by the abnormality determiner from among the first rotation number information, the second rotation number information and the steer angle information,
wherein
when a difference between the first rotation number information detected by the first detection circuit and the second rotation number information detected by the second detection circuit is equal to or greater than a preset first threshold value, at least one of the first rotation number information and the second rotation number information is compared with the steer angle information after conversion to the same characteristics values for an identification of which one of the first rotation number and the second rotation number information has abnormality, and
wherein
the first detection circuit detects first rotation angle information of the motor based on the first angle sensor,
the second detection circuit detects second rotation angle information of the motor based on the second angle sensor,
the steer angle information obtainer obtains third rotation angle information regarding the steer angle information detected by the external sensor,
the abnormality determiner performs abnormality determination of each of the first to third rotation angle information after conversion to the same characteristic values and comparison with each other, and
the abnormality determiner does not perform abnormality determination when at least one of the first to third rotation angle information is determined as abnormal.

2. The motor controller of claim 1, wherein
the abnormality determiner performs at least one of (i) an abnormality notification process, (ii) an invalidation process of the first rotation angle information, the second rotation angle information, and the steer angle information, and (iii) an operation restriction process for restricting operation of the first or second detection circuits or the external sensor from which information determined as abnormal has been obtained when at least one of the first to third rotation angle information is determined as abnormal.

3. The motor controller of claim 1, further comprising:
a first power source configured to supply electric power to the first detection circuit and a second power source configured to supply electric power to the second detection circuit.

4. The motor controller of claim 1, wherein
the steer angle information obtainer obtains the steer angle information from at least one of (i) a stroke sensor that detects steer angle information of the vehicle, (ii) a torque sensor that detects a steering torque of the vehicle, and (iii) a steering angle sensor that detects steering angle information of the vehicle, respectively serving as the external sensor.

5. A motor control system comprising:
a reaction force motor configured to provide a reaction force to a steering member;
a turning motor configured to change a steer amount of a wheel;
a reaction force motor control unit configured to control the reaction force motor; and
a turning motor control unit configured to control the turning motor, wherein
the reaction force motor control unit or the turning motor control unit is provided as a motor controller, and the corresponding reaction force motor or the corresponding turning motor is provided as a motor of the motor controller, wherein the motor controller comprises:
a first angle sensor configured to detect rotation of the motor;
a first detection circuit of a first system, in which the first system comprises a first inverter and a first winding set, the first detection circuit configured to detect rotation number information of the motor based on an output of the first angle sensor;
a second angle sensor configured to detect rotation of the motor;
a second detection circuit of a second system, in which the second system comprises a second inverter and a second winding set, the second detection circuit configured to detect rotation number information of the motor based on an output of the second angle sensor;
a steer angle information obtainer configured to obtain steer angle information from an external sensor that detects the steer angle information involving the steering of a vehicle, the steer angle information obtainer being different from the first angle sensor and from the second angle sensor;
an abnormality determiner configured to determine abnormality of information having a degree of matching lower than a preset value in each of comparisons among a first rotation number information detected by the first detection circuit, a second rotation number information detected by the second detection circuit, and the steer angle information obtained from the external sensor when the comparisons are performed after conversion to same characteristics values; and
a control amount calculator configured to calculate a control amount of the motor based on the information not determined as abnormal by the abnormality determiner from among the first rotation number information, the second rotation number information and the steer angle information,
wherein
when a difference between the first rotation number information detected by the first detection circuit and the second rotation number information detected by the second detection circuit is equal to or greater than a preset first threshold value, at least one of the first rotation number information and the second rotation number information is compared with the steer angle information after conversion to the same characteristics values for an identification of which one of the first rotation number and the second rotation number information has abnormality, and
wherein
the first detection circuit detects first rotation angle information of the motor based on the first angle sensor,
the second detection circuit detects second rotation angle information of the motor based on the second angle sensor,
the steer angle information obtainer obtains third rotation angle information regarding the steer angle information detected by the external sensor,
the abnormality determiner performs abnormality determination of each of the first to third rotation angle information after conversion to the same characteristic values and comparison with each other, and
the abnormality determiner does not perform abnormality determination when at least one of the first to third rotation angle information is determined as abnormal.

6. The motor control system of claim 5, wherein
the reaction force motor control unit obtains the steer angle information from the turning motor control unit.

7. The motor control system of claim 5, wherein
the turning motor control unit obtains the steer angle information from the reaction force motor control unit.

8. A motor controller for controlling a motor used for steering of a vehicle, the motor controller comprising:
a first angle sensor configured to detect a rotation of the motor;
a first detection circuit configured to detect first rotation number information of the motor based on an output of the first angle sensor;
a second angle sensor configured to detect the rotation of the motor;
a second detection circuit configured to detect rotation number information of the motor based on an output of the second angle sensor;
a steer angle information obtainer configured to obtain steer angle information from an external sensor that detects the steer angle information involving the steering of the vehicle, the steer angle information obtainer being different from the first angle sensor and from the second angle sensor;
an abnormality determiner configured to compare:
(i) a first steering angle associated with the first rotation number information,
(ii) a second steering angle associated with the second rotation number information, and
(iii) a third steering angle associated with the steer angle information from the external sensor; and
a control amount calculator configured to control the motor based at least partly upon the first steering angle upon a determination that at least one of: a first set of conditions, a second set of conditions, and a third set of conditions is satisfied,
wherein the first set of conditions includes:
(i) determine that at least three rotation angles are normal,
(ii) determine that an absolute value of a difference between the first steering angle and the second steering angle is less than a first threshold, and
(iii) determine that an absolute value of a difference between the first steering angle and the third steering angle is less than a second threshold, wherein the second set of conditions includes:
(i) determine that all rotation angles are normal,
(ii) determine that the absolute value of the difference between the first steering angle and the second steering angle is less than the first threshold,
(iii) determine that an absolute value of a difference between the first steering angle and the third steering angle is NOT less than a second threshold, and
wherein the third set of conditions includes:
(i) determine that all rotation angles are normal,
(ii) determine that the absolute value of the difference between the first steering angle and the second steering angle is NOT less than the first threshold, and
(iii) determine that the absolute value of the difference between the first steering angle and the third steering angle is less than the second threshold.

9. The motor controller of claim 8,
wherein the control amount calculator is further configured to control the motor based at least partly upon an updated value of the first steering angle upon determining that a fourth set of conditions is satisfied,
wherein the fourth set of conditions includes:
(i) determine that all rotation angles are normal,
(ii) determine that the absolute value of the difference between the first steering angle and the second steering angle is NOT less than the first threshold,
(iii) determine that the absolute value of the difference between the first steering angle and the third steering angle is NOT less than the second threshold, and
(iv) determine that an absolute value of a difference between the second steering angle and the third steering angle is less than a third threshold, and
wherein the updated value of the first steering angle is set equal to a present value of the second steering angle upon the determination that the fourth set of conditions is satisfied.

* * * * *